United States Patent
Jinno et al.

(10) Patent No.: US 12,510,347 B2
(45) Date of Patent: Dec. 30, 2025

(54) SCALE THICKNESS MEASURING METHOD

(71) Applicant: MITSUBISHI HEAVY INDUSTRIES, LTD., Tokyo (JP)

(72) Inventors: Kentaro Jinno, Tokyo (JP); Masaaki Kurokawa, Tokyo (JP); Hajime Kumatani, Tokyo (JP); Yuji Kohashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 151 days.

(21) Appl. No.: 18/566,327

(22) PCT Filed: May 19, 2022

(86) PCT No.: PCT/JP2022/020802
§ 371 (c)(1),
(2) Date: Dec. 1, 2023

(87) PCT Pub. No.: WO2023/037664
PCT Pub. Date: Mar. 16, 2023

(65) Prior Publication Data
US 2024/0255268 A1 Aug. 1, 2024

(30) Foreign Application Priority Data
Sep. 8, 2021 (JP) ................. 2021-146218

(51) Int. Cl.
*G01B 7/06* (2006.01)
*G01N 27/9013* (2021.01)
*G01N 27/904* (2021.01)

(52) U.S. Cl.
CPC ........... *G01B 7/105* (2013.01); *G01N 27/902* (2013.01); *G01N 27/904* (2013.01)

(58) Field of Classification Search
None
See application file for complete search history.

(56) References Cited

U.S. PATENT DOCUMENTS

| 4,808,927 A | * | 2/1989 | Cecco | G01N 27/904 324/225 |
| 2002/0149360 A1 | * | 10/2002 | Le | G01B 7/105 324/230 |

(Continued)

FOREIGN PATENT DOCUMENTS

| JP | H05-087510 A | 4/1993 |
| JP | 5159436 B2 | 3/2013 |
| JP | 5968658 B2 | 8/2016 |

OTHER PUBLICATIONS

International Search Report dated Jul. 12, 2022, issued in counterpart Application No. PCT/JP2022/020802. (4 pages).

(Continued)

*Primary Examiner* — Nasima Monsur
(74) *Attorney, Agent, or Firm* — WHDA, LLP

(57) ABSTRACT

A measuring method of measuring a thickness of attachments attached to an outer peripheral surface of a heat transfer pipe by using an eddy-current probe, which is provided with an excitation coil and a pair of detection coils, the method including: obtaining a point in which the difference becomes zero is set as a reference point in a region to which the attachments is not attached by calculating a difference between the axial and circumferential components of the magnetic field detected by the pair of detection coils; moving the eddy-current probe inside the heat transfer pipe in the direction of the axis; calculating the difference between the axial and circumferential components of the magnetic field; obtaining a drift amount by comparing the difference with the reference point; and calculating the thickness of the attachments from a calibration curve obtained in advance on the basis of the drift amount.

2 Claims, 2 Drawing Sheets

(56) References Cited

U.S. PATENT DOCUMENTS

2012/0119733 A1* 5/2012 Higashi ................ G01N 27/902
   324/240
2012/0179402 A1* 7/2012 Kawata ................ F22B 37/003
   702/65

OTHER PUBLICATIONS

Written Opinion dated Jul. 12, 2022, issued in counterpart Application No. PCT/JP2022/020802, with English Translation. (6 pages).

* cited by examiner

SCALE THICKNESS MEASURING METHOD

TECHNICAL FIELD

The present disclosure relates to a scale thickness measuring method. Priority is claimed on Japanese Patent Application No. 2021-146218, filed Sep. 8, 2021, the content of which is incorporated herein by reference.

BACKGROUND ART

A steam generator in a nuclear power generation facility accommodates a plurality of heat transfer pipes. It is known that attachments called scale are generated on the outer peripheral surface of the heat transfer pipe as time goes by. If the thickness of such scale becomes too large, the heat transfer performance of the heat transfer pipe may be affected. Therefore, there has been an increasing demand for a technique that can remotely measure and evaluate the thickness of the scale.

For example, Patent Document 1 below discloses a technique for measuring a thickness of scale using a probe that generates an eddy current. In this technique, a coil is excited while inserting and moving the probe into the heat transfer pipe. Then, a magnetic field is generated in the scale and this magnetic field in turn generates an induced voltage in a sensor coil. Since the impedance of the coil at this time is a function of the thickness of the scale, it is said that the thickness of the scale can be determined by measuring the impedance. That is, this technique uses a self-guided standard comparison method.

CITATION LIST

Patent Document

Patent Document 1: Japanese Unexamined Patent Application, First Publication No. H5-87510

SUMMARY OF INVENTION

Technical Problem

However, since the above self-guided standard comparison type probe was vulnerable to bending or stretching, rattling, and temperature changes, there was a problem that the thickness of the scale was not accurately measured.

The present disclosure has been made to solve the above-described problems and an object thereof is to provide a scale thickness measuring method capable of performing more accurate measurement.

Solution to Problem

In order to solve the above-described problems, a scale thickness measuring method according to the present disclosure is a scale thickness measuring method of measuring a thickness of scale attached to an outer peripheral surface of a heat transfer pipe extending in a direction of an axis and having a cylindrical shape centered on the axis by using an eddy-current probe, which is provided with an excitation coil generating an eddy current, and a pair of detection coils which are provided integrally with the excitation coil and detecting axial and circumferential components of a magnetic field formed by the eddy current, the scale thickness measuring method including: obtaining a reference point in a region of the heat transfer pipe to which the scale is not attached by calculating a difference between the axial and circumferential components of the magnetic field detected by the pair of detection coils; moving the eddy-current probe inside the heat transfer pipe in the direction of the axis while inserting the eddy-current probe into the heat transfer pipe; calculating the difference between the axial and circumferential components of the magnetic field detected by the pair of detection coils; obtaining a drift amount by comparing the difference with the reference point; and calculating the thickness of the scale from a calibration curve obtained in advance on the basis of the drift amount.

Advantageous Effects of Invention

According to the present disclosure, it is possible to provide a scale thickness measuring method capable of performing more accurate measurement.

DESCRIPTION OF EMBODIMENTS

Hereinafter, an eddy-current probe 1 according to an embodiment of the present disclosure and a scale thickness measuring method using the eddy-current probe will be described with reference to FIGS. 1 to 5.

(Configuration of Eddy-Current Probe)

Figure 1:
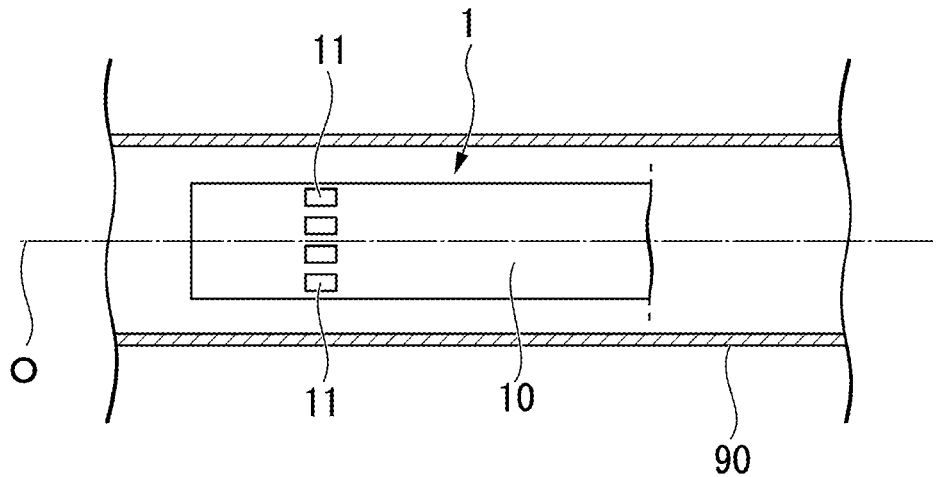
FIG. 1 is a schematic view showing a configuration of an eddy-current probe according to an embodiment of the present disclosure.

A configuration of the eddy-current probe 1 will be described with reference to FIGS. 1 to 3. As shown in FIG. 1, the eddy-current probe 1 is used while being inserted into a heat transfer pipe 90. A plurality of the heat transfer pipes 90 are provided inside, for example, a steam generator. The heat transfer pipe 90 extends along an axis O and has a cylindrical shape centered on the axis O. Attachments called scale are generated on the outer peripheral surface of the heat transfer pipe 90 as time goes by. The eddy-current probe 1 is used to measure the thickness of the scale.

The eddy-current probe 1 includes a probe body 10 and a plurality of coil assemblies 11. Various wirings are accommodated inside the probe body 10. The probe body 10 is formed in a columnar shape extending along the axis O. The plurality of coil assemblies 11 are provided at the tip of the probe body 10 at intervals in the circumferential direction of the axis O.

Figure 2:
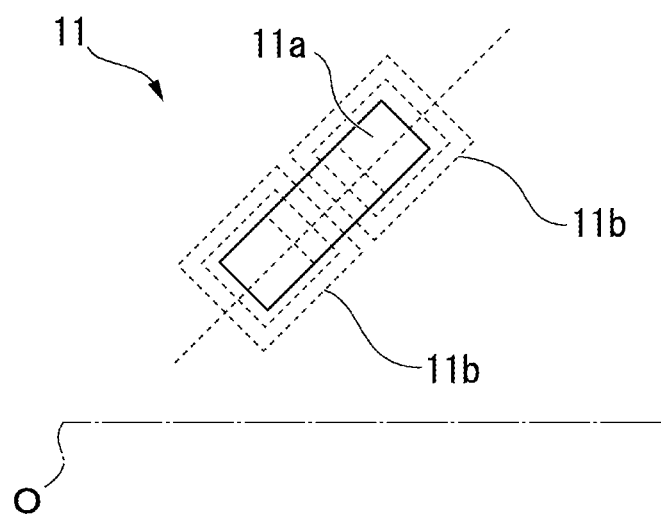
FIG. 2 is a diagram showing a configuration of a detection coil and an excitation coil included in the eddy-current probe according to the embodiment of the present disclosure and is a diagram as viewed from the inside in the radial direction of a heat transfer pipe.
Figure 3:
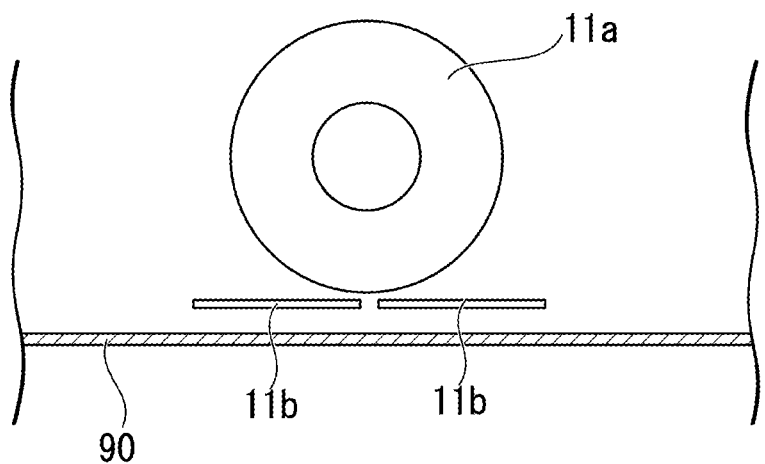
FIG. 3 is a diagram showing a configuration of the detection coil and the excitation coil included in the eddy-current probe according to the embodiment of the present disclosure and is a diagram as viewed from the direction of the axis of the heat transfer pipe.

As shown in FIGS. 2 and 3, the coil assembly 11 includes one excitation coil 11a and a pair of detection coils 11b. The excitation coil 11a has a ring shape. The excitation coil 11a is disposed inside the probe body 10 so that the diameter direction is orthogonal to the inner peripheral surface of the heat transfer pipe 90. Further, the excitation coil 11a is disposed in a posture inclined at an angle of about 45° with respect to the axis O. The excitation coil 11a generates an eddy current in the vicinity of the inner peripheral surface of the heat transfer pipe 90 by being excited by a voltage supplied from the outside.

The detection coil 11b is integrally provided on the outer peripheral side (that is, the side of the heat transfer pipe 90) in relation to the excitation coil 11a. Each detection coil 11b has, for example, a rectangular ring shape and extends along the inner peripheral surface of the heat transfer pipe 90. Like the excitation coil 11a, the detection coil 11b is disposed in a posture inclined at an angle of about 45° with respect to the axis O and a pair of the detection coils are provided at intervals in the inclined direction.

Each detection coil 11b is used to capture a change in magnetic field caused by the eddy current generated by the excitation coil 11a. For example, changes in the circumferential magnetic field and the axial magnetic field are detected by a detection voltage difference between the detection coil 11b on one side and the detection coil 11b on the other side.

(Scale Thickness Measuring Method)

Figure 4:
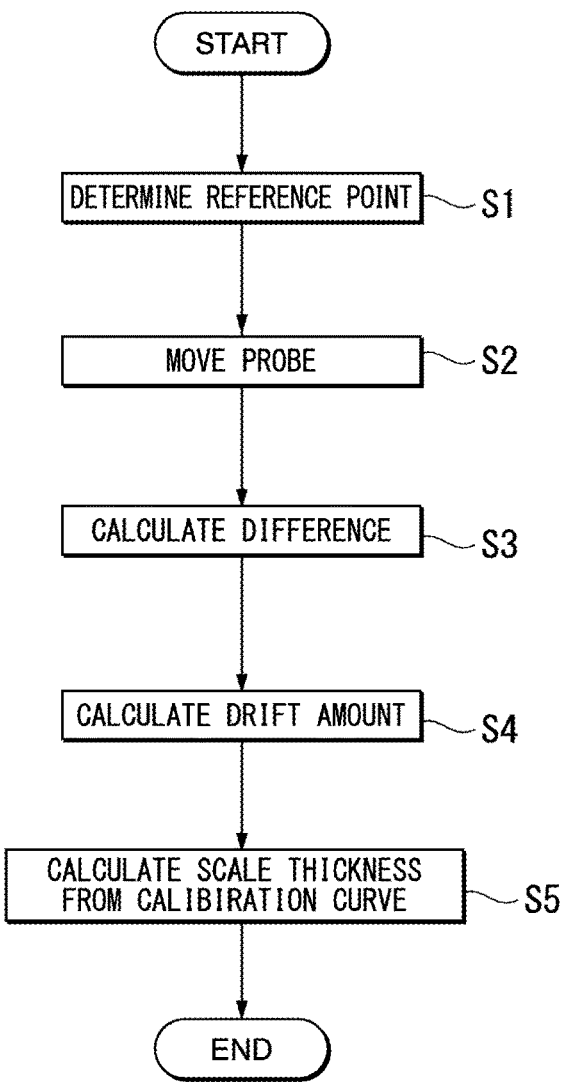
FIG. 4 is a process diagram showing a scale thickness measuring method according to the embodiment of the present disclosure.
Figure 5:
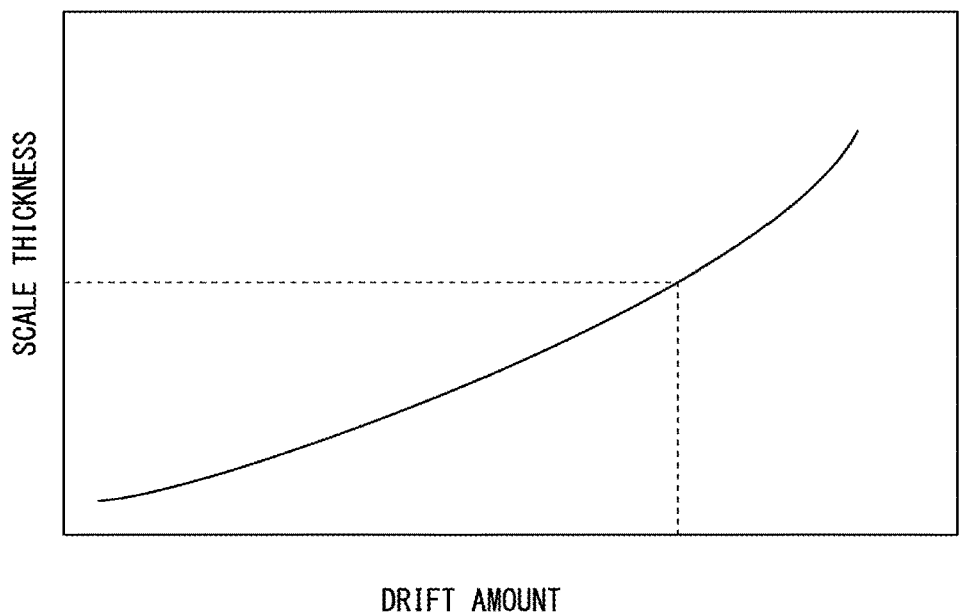
FIG. 5 is an example of a calibration curve showing a relationship between the thickness of the scale and the drift amount of the magnetic field due to the scale.

Next, a scale thickness measuring method using the eddy-current probe 1 will be described. As shown in FIG. 4, this measuring method includes a reference point determination step S1, a probe movement step S2, a difference calculation step S3, a drift amount calculation step S4, and a scale thickness calculation step S5.

In the reference point determination step S1, the magnetic field detected by the pair of detection coils 11b is measured in a region in which no scale is attached in the heat transfer pipe 90 or on a sample (calibration test piece) having the same material and dimensions as the heat transfer pipe 90. Specifically, a difference between the component in the direction of the axis O and the component in the circumferential direction of the magnetic field is calculated and a point in which the difference becomes zero is set as a reference point. That is, the reference point determination step S1 is performed to correct the detection result of the eddy-current probe 1 in a state in which there is no scale.

Next, the probe movement step S2 is performed. In the probe movement step S2, the eddy-current probe 1 is inserted into the heat transfer pipe 90 and is moved in the direction of the axis O. At this time, an eddy current is generated near the inner peripheral surface of the heat transfer pipe 90 by the excitation coil 11a.

While the eddy-current probe 1 is moved, the scale attached to the outer peripheral surface of the heat transfer pipe 90 changes the magnetic field detected by the detection coil 11b. In the subsequent difference calculation step S3, the difference between the component in the direction of the axis O and the component in the circumferential direction of the magnetic field generated by the pair of detection coils 11b is calculated. In a state in which the scale is attached, this difference value shifts (drifts) from the reference point. In the drift amount calculation step S4, a change amount (drift amount) from the reference point is calculated.

Next, the scale thickness calculation step S5 is performed. In this step S5, the scale thickness is calculated by comparing the drift amount with the calibration curve obtained in advance. As indicated by an example of FIG. 5, the drift amount and the scale thickness are in a proportional relationship. That is, when the drift amount increases, the scale thickness also tends to increase. In step S5, the scale thickness is obtained on the basis of the calibration curve. With the above steps, all steps of the scale thickness measuring method are completed.

Operation and Effect

Conventionally, it was common to use a probe using a method called a self-guided standard comparison method when measuring the scale thickness. In this method, one coil acts on a test object and the other coil acts on a reference object to detect differences. This method is used when it is necessary to detect an absolute amount such as a thinning amount in the test object. However, there was a problem in that accurate measurement was not easily performed due to the large influence of lift-off noise.

Therefore, the eddy-current probe 1 and the scale thickness measuring method according to this embodiment have the above-described configuration. According to the configuration and method, a difference between the component in the direction of the axis O and the component in the circumferential direction of the magnetic field detected by the pair of detection coils 11b is calculated and this difference is compared with the reference point to obtain the drift amount. Further, the thickness of the scale is calculated from the calibration curve obtained in advance on the basis of the drift amount. In this way, since a so-called differential method is used, it is possible to accurately measure the scale thickness while being robust against external disturbances such as bending and stretching of the probe. As a result, it is possible to more precisely and accurately evaluate the scale thickness.

Further, according to the above-described configuration, since the excitation coil 11a and the pair of detection coils 11b are arranged in a direction inclined with respect to the axis O, it is possible to generate an eddy current in a wider range of the direction of the axis O and the circumferential direction and to stably detect a change in magnetic field caused by the eddy current in a wider range.

Further, according to the above-described configuration, the plurality of coil assemblies 11 are arranged at intervals in the circumferential direction. Accordingly, it is possible to stably and accurately measure the scale thickness over the entire region of the heat transfer pipe 90 in the circumferential direction.

Other Embodiments

Although the embodiment of the present disclosure has been described above with reference to the drawings, the detailed configuration is not limited to this embodiment and design changes and the like may be made without departing from the gist of the present disclosure. For example, in the above-described embodiment, a configuration has been described in which the coil assembly 11 is inclined by 45° with respect to the axis O. However, the posture of the coil assembly 11 is not limited thereto and the inclined angle may be smaller than 45° if the coil assembly is slightly inclined with respect to the axis O.

Further, in the above-described embodiment, an example has been described in which the detection coil 11b is provided on the outer peripheral side of the excitation coil 11a. However, it is also possible to adopt a configuration in which the detection coil 11b is disposed to surround the excitation coil 11a. Further, it is also possible to adopt a configuration in which a pair of excitation and detection coils are provided and each is disposed along the direction of the axis O and the circumferential direction. In any method, the same operation and effect as those of the above-described embodiment can be obtained.

APPENDIX

The scale thickness measuring method described in each embodiment is understood, for example, as below.

(1) A scale thickness measuring method according to a first aspect is a scale thickness measuring method of measuring a thickness of scale attached to the outer peripheral surface of the heat transfer pipe 90 extending in the direction of the axis O and having a cylindrical shape centered on the axis O by using the eddy-current probe 1, which is provided with the excitation coil 11a generating an eddy current, and the pair of detection coils 11b which are provided integrally with the excitation coil 11a and detecting axial and circumferential components of a magnetic field formed by the eddy current, the scale thickness measuring method includes: step S1 of obtaining a reference point in a region of the heat transfer pipe 90 to which the scale is not attached by calculating a difference between the axial and circumferential components of the magnetic field detected by the pair of detection coils 11b; step S2 of moving the eddy-current probe 1 inside the heat transfer pipe 90 in the direction of the axis O while inserting the eddy-current probe into the heat transfer pipe 90; step S3 of calculating the difference between the axial and circumferential components of the magnetic field detected by the pair of detection coils 11b; step S4 of obtaining a drift amount by comparing the difference with the reference point; and step S5 of calculating the thickness of the scale from a calibration curve obtained in advance on the basis of the drift amount.

According to the above-described configuration, a difference between the component in the direction of the axis O and the component in the circumferential direction of the magnetic field detected by the pair of detection coils 11b is calculated and this difference is compared with the reference point to obtain the drift amount. Further, the thickness of the scale is calculated from the calibration curve obtained in advance on the basis of the drift amount. In this way, since a so-called differential method is used, it is possible to accurately measure the scale thickness while being robust against external disturbances such as bending and stretching of the probe.

(2) According to the scale thickness measuring method of a second aspect, in the scale thickness measuring method according to the first aspect, the excitation coil 11a and the pair of detection coils 11b may be arranged in a direction inclined with respect to the axis O.

According to the above-described configuration, since the excitation coil 11a and the pair of detection coils 11b are arranged in a direction inclined with respect to the axis O, it is possible to generate an eddy current in a wider range in the direction of the axis O and the circumferential direction and to stably detect a change in magnetic field caused by this eddy current in a wider range.

(3) According to the scale thickness measuring method of a third aspect, in the scale thickness measuring method according to the first or second aspect, a plurality of the excitation coils 11a and the pair of detection coils 11b may be arranged at intervals in the circumferential direction of the eddy-current probe 1.

According to the above-described configuration, it is possible to stably and accurately measure the scale thickness over the entire region of the heat transfer pipe 90 in the circumferential direction.

INDUSTRIAL APPLICABILITY

The present disclosure relates to a method of measuring a thickness of scale attached inside a heat transfer pipe included in a steam generator of a nuclear power generation facility. According to the method of the present disclosure, it is possible to accurately measure the thickness of the scale.

REFERENCE SIGNS LIST

90 Heat transfer pipe
1 Eddy-current probe
10 Probe body
11 Coil assembly
11a Excitation coil
11b Detection coil
O Axis

What is claimed is:

1. A thickness measuring method of measuring a thickness of attachments attached to an outer peripheral surface of a heat transfer pipe extending in a direction of an axis and having a cylindrical shape centered on the axis by using an eddy-current probe, the thickness measuring method comprising:
    providing the heat transfer pipe;
    providing the eddy-current probe, which is provided with an excitation coil generating an eddy current, and a pair of detection coils which are provided integrally with the excitation coil and detecting axial and circumferential components of a magnetic field formed by the eddy current, wherein the excitation coil and the pair of detection coils are arranged in a direction inclined with respect to the axis;
    obtaining a point in which a difference becomes zero is set as a reference point in a region of the heat transfer pipe to which the attachments is not attached by calculating the difference between the axial and circumferential components of the magnetic field detected by the pair of detection coils;
    moving the eddy-current probe inside the heat transfer pipe in the direction of the axis while inserting the eddy-current probe into the heat transfer pipe, and an eddy-current being generated near the inner peripheral surface of the heat transfer pipe by the excitation coil, while the eddy-current probe is moved, the attachments attached to the outer peripheral surface of the heat transfer pipe changes the magnetic field detected by the detection coils;
    calculating the difference between the axial and circumferential components of the magnetic field detected by the pair of detection coils, in a state in which the attachments is attached, a value of the difference drifts from the reference point;
    obtaining a drift amount by comparing the difference with the reference point; and
    using a calibration curve in which the drift amount and the thickness of attachments are proportional to each other, and calculating the thickness of the attachments from the calibration curve obtained in advance on the basis of the drift amount.

2. The thickness measuring method according to claim 1, wherein the excitation coil and the pair of detection coils constitute a coil assembly, a plurality of the coil assembly are arranged at intervals in the circumferential direction of the eddy-current probe.

* * * * *